United States Patent [19]

Binns

[11] Patent Number: 4,919,577
[45] Date of Patent: Apr. 24, 1990

[54] BLIND FASTENER

[75] Inventor: Lloyd S. Binns, Harbor City, Calif.

[73] Assignee: Hi-Shear Corporation, Torrance, Calif.

[21] Appl. No.: 310,298

[22] Filed: Feb. 13, 1989

[51] Int. Cl.$^5$ .................. F16B 13/04; F16B 13/06
[52] U.S. Cl. .................................. 411/43; 411/34; 411/55
[58] Field of Search ...................... 411/34–38, 411/43, 55, 187, 189, 223, 239, 241; 29/520, .522.1

[56] References Cited

U.S. PATENT DOCUMENTS

| | | | |
|---|---|---|---|
| 1,635,082 | 7/1927 | Hultgren et al. | 411/189 |
| 4,752,169 | 6/1988 | Pratt | 411/54 |
| 4,772,167 | 9/1988 | Beals | 411/43 |

Primary Examiner—Neill R. Wilson
Attorney, Agent, or Firm—Donald D. Mon

[57] ABSTRACT

A blind fastener with an axially extending sleeve having an axially extending internally threaded passage therethrough. A head at one end has an axially facing surface thereon with a periphery which is centered on its axis. A mandrel includes an axially extending threaded shank that is threaded into and through the passage. A torque-off groove is formed on the shank. Torque tool engaging surfaces are accessible at the head end of the sleeve, and blind upsetting structure is axially movable by rotating the mandrel to form an enlarged body at the unheaded end of the sleeve. A nut is threaded to the mandrel with a bearing face facing toward the surface of the head of the sleeve. The bearing face of the nut is concavely shaped so as to make contact with and thereby to make a retention engagement with at least some points around the periphery to hold the sleeve against rotation relative to the nut when the mandrel is drawn into the sleeve with the nut pressed against the head.

15 Claims, 3 Drawing Sheets

BLIND FASTENER

FIELD OF THE INVENTION

This invention relates to a blind fastener for joining workpieces together, all assembly procedures being conducted from only one side of the work.

BACKGROUND OF THE INVENTION

A blind fastener of the type with which this invention is most concerned is shown in Wing and Schuster patent No. 3,129,630. This fastener has enjoyed continuous and very substantial sales to this day, and has been the subject of many improvements.

This type of fastener has a tubular sleeve with a shank, a tapered end, and a head at its other end. A threaded mandrel is threaded into and through the shank. The mandrel has a head that faces toward the tapered end of the sleeve. A cylindrical collar is placed on the mandrel, and turning the mandrel draws its head against the collar, forcing the collar onto and over the sleeve, thereby forming an enlargement. The combination of the head on the sleeve, and the enlarged collar, pulls and holds the workpieces together, and the shank provides resistance to shear forces. The device then functions as a blind rivet or as a blind bolt.

The mandrel and the head of the sleeve are provided with torque tool engaging mans so the mandrel can be turned in the sleeve to set the fastener. A groove is formed in the mandrel so that excess length of the mandrel will torque off at that location after the fastener has been set.

This fastener, commonly known by its trade names "Beta Bolt" and "Beta-Lok", has been sold successfully by Hi-Shear Corporation of Torrance, Calif. for many years, and still is. In order to make the device more useful and convenient for assembly operations, attention has been given to the accessible end of the fastener. The fastener parts which remain in the completed assembly after setting remain basically unchanged.

In the Wing and Schuster device, tool engaging recesses are formed in the head of the sleeve. The tool which sets the fastener has a nose with projections that enter into these recesses to hold the sleeve against rotation. The tool also includes a drive portion that engages the mandrel, and when turned rotates the mandrel so it moves axially to set the fastener.

Disadvantages of this arrangement are that the nose pieces wear out, that their sharp protruding end features which engage the recess can slip out and mar a surface, and that the portions of the mandrel which break off are relatively small, and sometimes tend to get away from the assemblers.

It has been suggested that, instead of engaging the head of the fastener, the tool could instead be provided with means to engage a nut threaded onto a lengthened mandrel adjacent to the head of the sleeve. Then the nut would be turned down against the head of the sleeve to jam on it. This would constitute means to hold the sleeve against rotation, and the nut would be a throwaway item that would keep the torqued off portion of the mandrel under control. An example of such a device is shown in U.S. Pat. Nos. 4,772,167 and 4,752,169.

This approach has some advantages, but often requires surface treatment to the fastener head, or discontinuities in it to assure enough retention forces to prevent relative rotation of the nut and the sleeve. It is an object of this invention to improve this situation and to make possible a truly effective use of a fastener of this type which does not require special head treatment, or tool engaging recesses.

There is yet another problem in devices wherein a mandrel stem torques off at a breakneck groove. When the end twists off it tends to leave behind a rough stem surface which may even include sharp pointed regions. These are not acceptable in high quality aircraft construction.

One of the embodiments of this invention provides the advantage that when the drive portion of its mandrel torques off, it leaves behind in the set fastener a smooth planar surface which is acceptable without further treatment.

BRIEF DESCRIPTION OF THE INVENTION

This invention is carried out in a blind fastener that includes an internally threaded sleeve with a head at one end and an axially-extending taper at the other. A mandrel is threaded into the sleeve. It has a head that bears against a collar which can be pushed onto and over the tapered end of the sleeve to form an enlarged head. This is sometimes called a "blind upsetting means". A nut is threaded onto the mandrel to be turned against the head of the sleeve. In turn, the nut is restrained against rotation by a torque tool, and the mandrel is engaged by the tool to turn them counter rotatively to set the fastener.

According to this invention, the nut has a concave face that faces toward the head of he sleeve. This face is adapted to make a smooth circumferential engagement at the outer edge of the fastener head to restrain the sleeve against rotation.

According to a preferred but optional feature of this invention the concave face is the frustrum of a cone, and the outer edge of the head of the sleeve is chamfered to match this concave face.

The utility of this invention, and the intended scope of its claims is not limited to blind fasteners with the specific blind upsetting means as already described. Instead it is useful in setting any blind fastener in which the setting force is developed by turning a threaded mandrel in a sleeve to enlarge a blind upsetting means, thereby to set the fastener.

The above and other features of this invention will be fully understood from the following detailed description and the accompanying drawings, in which:

DETAILED DESCRIPTION OF THE INVENTION

Figure 1:
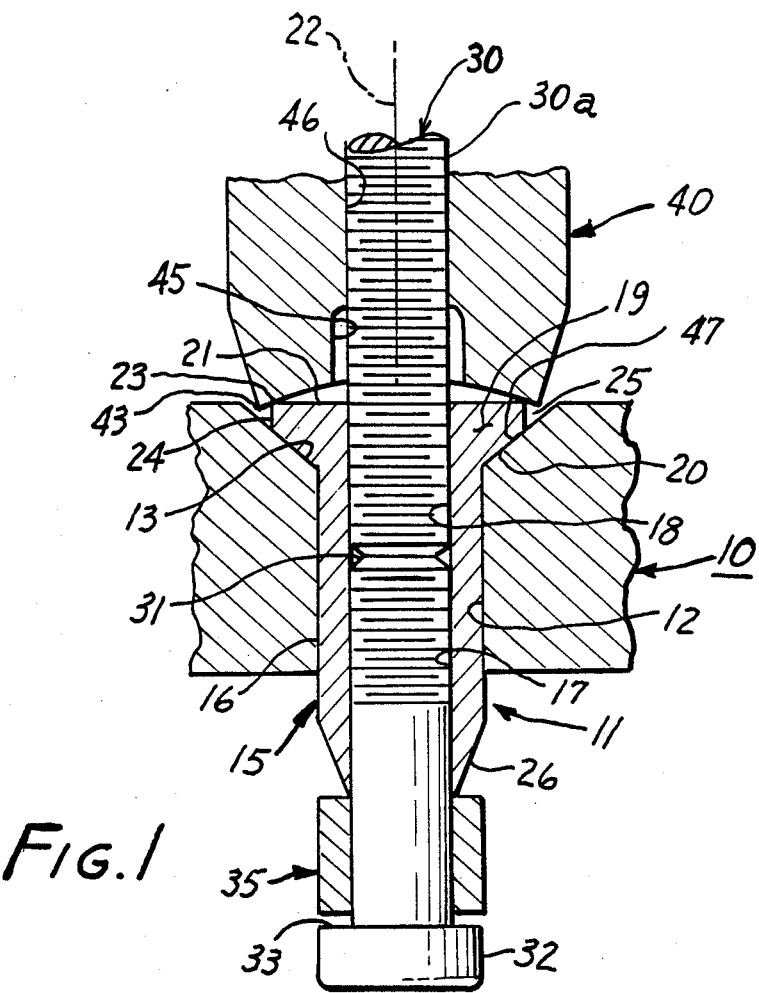
FIG. 1 is an axial cross-section of one embodiment of the invention.
Figure 2:
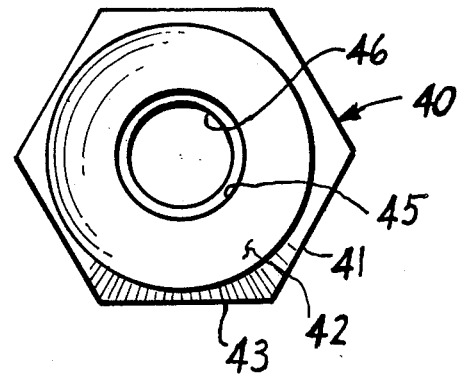
FIG. 2 is a bottom view of the installation nut in FIG. 1.

FIG. 1 shows a workpiece 10, which may represent one or more structural elements in which the fastener 11 is to be set. For example, workpiece 10 may be two overlapped structural plates.

The workpiece has a hole 12 in which the fastener is to be set. In the drawings, the hole includes a countersink 13 to receive a countersink fastener and provide a flush assembly. Alternatively, there may be no countersink, and the fastener may have a protruding head that rises above it. This invention is applicable to both types, but provides its best advantages in a countersink installation.

Fastener 11 includes a sleeve 15 having a tubular portion 16 with a central passage 17. Passage 17 has an internal thread 18.

The sleeve also includes a countersink head 19 with a tapered surface 20 that closely matches countersink 13. It also has a surface 21 facing axially along axis 22 away from the workpiece. Importantly for this invention, surface 21 has a circular peripheral edge 23 centered on axis 22, and a circumferential land 24, conveniently cylindrical. This leaves a circumferential void 25 in the countersink between the head and the workpiece. The sleeve also has an external taper 26 that forms an expansion "nose".

A mandrel 30 has a thread 30a which is threaded into the sleeve. The free end of the mandrel has tool engaging surfaces (not shown) for engagement by a torque tool to turn it. A torque-off notch 31 (sometimes called a "breakneck") is formed midway along its length.

The mandrel further includes a head 32 with a bearing surface 33 that can be brought to bear against a cylindrical collar 35.

When the mandrel is turned relative to the sleeve, its bearing face forces the collar over the tapered nose of the sleeve and forms an enlargement which forms a head and sets the fastener as a consequence of the lateral expansion of the collar. This head formation is well-known, and is shown in the said Wing and Schuster patent. It is a form of "blind upsetting means".

An installation nut 40 is threaded onto the mandrel and is brought to bear against the head of the sleeve. A torque tool (not shown) restrains nut 40 against rotation and turns the mandrel relative to the sleeve to set the fastener. The nut has an external set of torque tool engaging surfaces 41, conveniently a hexagonal array.

Nut 40 has a bearing face 42 which according to this invention is concave. It is a surface of revolution around the central axis. Its edge 43 extends radially and axially beyond edge 23 of the sleeve head into the void 25. The void is provided to receive it. This portion of the nut can thereby pass edge 23 but still not contact the workpiece. Furthermore, the periphery of the nut just adjacent to this edge tapers away from it at a lesser angle than the angle of the countersink. This also avoids interfering contact with the workpiece.

A thread relief 45 is formed in the nut adjacent to the bearing face, but enough treads 46 exist to provide axial force to set the fastener.

As can be seen in the drawings, a circumferential continuous contact area defined by line 47 exists between the nut and the edge of the sleeve head. This is a relatively small area, and generates a high unit load, at a maximum diameter. Therefore the restraining torque is optimally high. This is accomplished without modifying the surface of the head in any way in the sense of discontinuities in it. The decrease in head diameter to form the circumferential land need not be particularly large, nor is the depth of the void. A depth of void between about 0.005 and 0.012 inches appears to be adequate for most practical fasteners.

The contact area neet not be continuous, although it usually will be. Countersink or protruding heads will generally provide a continuous peripheral edge. However, protruding heads need not be circular, and in some instances may have other shapes such as hexagonal. Then the bearing face on the nut will bear only against the apexes. Still for many installations this will provide enough contact area for the needed retraint.

Figure 3:
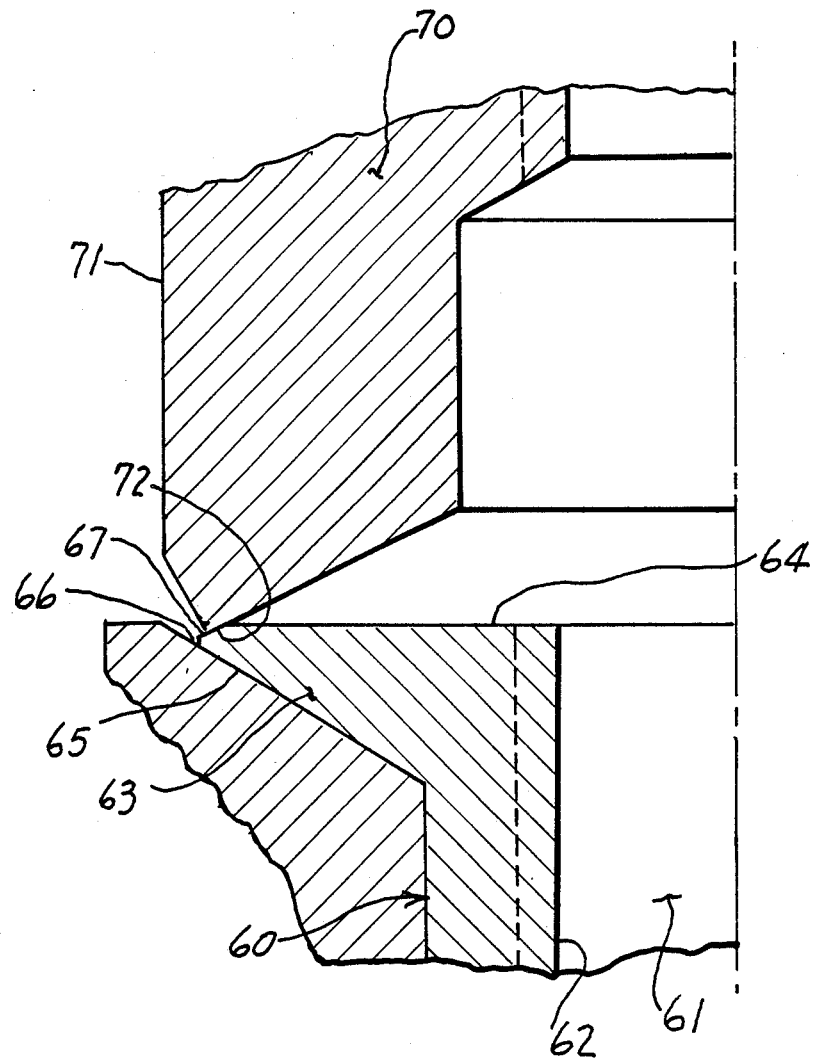
FIG. 3 is a fragmentary axialross-section of the presently-preferred embodiment of the invention.
Figure 4:
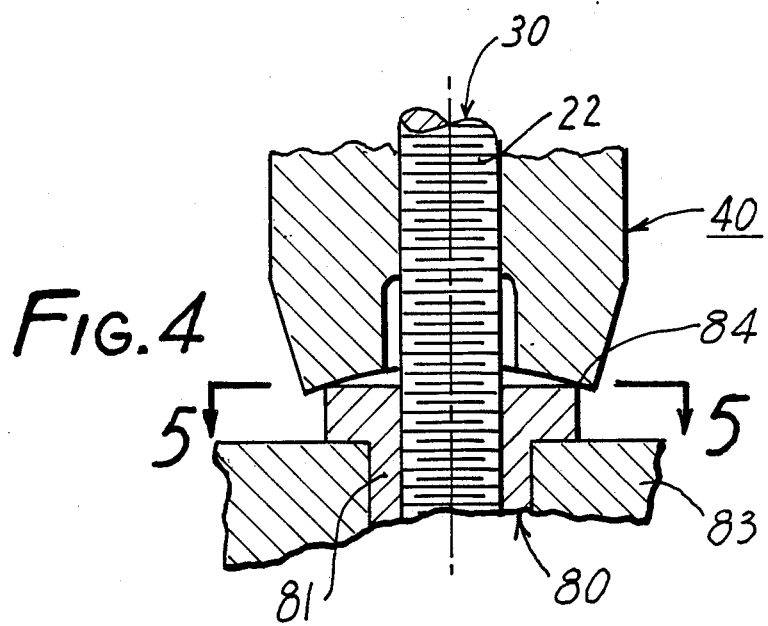
FIG. 4 is a fragmentary cross-section showing the use of a protruding head fastener.
Figure 5:
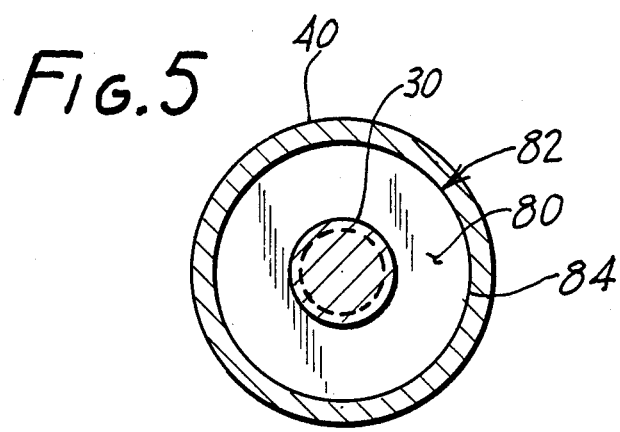
FIG. 5 is a cross-section taken at line 5—5 in FIG. 4.

FIGS. 4 and 5 show the use of a protruding head fastener 80 with a shank 81 and a head 82 that projects above workpiece 83 when the fastener is installed. The head has a circular edge 84 which is to be contacted by installation nut 40. Because the only difference between this structure and the structure of either FIG. 1 or FIG. 3 is the shape of the head, and the absence of a countersink, part members respective to FIG. 1 are used except for this feature.

For reasons which are not entirely understood, when the stem torques off at the breakneck groove in the embodiment of FIG. 1, occasionally the surface of the stem which faces toward the sleeve head will be rough, and may include some pointed structures. Pure shear forces at the breakneck would not be expected to produce such a surface. Instead the surface that results from pure shear separation would be expected to be smooth and flat. Surface irregularities are therefore theorized to be the consequence of some tensile forces exerted along the stem while it is being sheared off.

While this fastener is being set, regardless of differences in torque loads along the stem, the thread of the stem tracks through the thread in the sleeve and in the drive nut. However, should the sleeve and nut have rotated slightly relative to one another, then even though the stem will still be threaded through both of them, there may arise a tensile force across the breakneck groove in addition to the shear forces. It is proposed that this tensile force is what causes undesirable surface irregularities.

Whatever the cause, and the foregoing is only a theory which may in fact be incorrect, the construction of FIG. 3 has proved to avoid the problem, and regularly produces a smooth and flat surface on the end of the stem that remains in the fastener.

In FIG. 3, a sleeve 60 is generally identical to sleeve 15. It includes a central passage 61 and an internal thread 62. Head 63 has an upper surface 64 and a countersink surface 65. It also includes a tapered nose (not shown) as in sleeve 15.

The head is circular, and is bounded at its outer periphery by a cylindrical land 66. However, in contrast to land 24 in FIG. 1, 1 and 66 does not form a line-type engagement edge with the upper surface of the head. Instead a chamfered bearing face 67 is formed to extend between them to form the edge. This face is the frustrum of a cone, and provides a substantial circumferential area around the head for engagement by the drive nut.

Drive nut 70 has external torque tool engagement surfaces 71, perhaps a hexagonal array. It also has a concave bearing face 72, which is frustoconical, having the same conical angle as bearing face 67 so they will make a good surface to surface contact with one another.

When this feature is used for the contact instead of the sharp edge of FIG. 1, a smooth surface results. It therefore appears that the larger surface-to-surface bearing area, plus the resulting force vectors developed between the matching bearing surfaces of the nut and of the contact area, will more quickly restrain the nut and sleeve against relative rotation while they are still threaded to the mandrel without generation of substantial tensile force within the stem itself.

A one-half conical angle of about 63 degrees 30 minutes has proved optimal for the contact surfaces. A surface of the conical angle extending from a radius of about 0.336 to 0.352 inches has proved to be suitable on the head of a 6/32 inch fastener.

The tubular collar and tapered nose on the sleeve are the presently preferred embodiments of blind upsetting means with which this application can advantageously be employed. Conventional expanders which are drawn into an open-ended tubular rivet to enlarge the end are other useful types. For example, the fasteners shown in U.S. Pat. Nos. 2,789,619 and 2,959,999, which are incorporated herein by reference, show useful blind upsetting means.

By utilizing the concave face on the drive nut, pressed against an edge of the sleeve head, this invention can reliably enjoy the advantages of fastener heads that are not significantly modified for engaagement by a torque tool. The slight reduction in head area is located at a region which is unimportant to the strength of the head.

This invention is not to be limited by the embodiments shown in the drawings and described in the description, which are given by way of example and not of limitation, but only in accordance with the scope of the appended claims.

I claim:

1. In a blind fastener of the type having a central axis and an axially extending sleeve with an axially extending internally threaded passage therethrough, a head at one end having an axially facing surface thereon with a periphery which is centered on said axis; a mandrel including an axially extending threaded shank threaded into and through said passage, a torque-off groove on said shank, and torque tool engaging means accessible at the head end of said sleeve, and blind upsetting means axially movable by rotating said mandrel to form an enlarged body at the unheaded end of said sleeve; and a nut threaded to said mandrel with a bearing face facing toward said surface of the head of said sleeve, the improvement comprising:
said bearing face of said nut being concavely shaped so as to make contact with and thereby a retention engagement with at least some points around said periphery to hold the sleeve against rotation relative to the nut when the mandrel is drawn into the sleeve with the nut pressed against said head.

2. A blind fastener according to claim 1 in which said periphery is a circular edge.

3. A blind fastener according to claim 2 in which said edge is chamfered to form a frustoconical bearing face and in which that portion of the bearing face on the nut is also frustoconical, the conical angles being substantially equal.

4. A blind fastener according to claim 2 in which a cylindrical land forms the outermost portion of the edge of said sleeve head.

5. A blind fastener according to claim 4 in which said edge is chamfered to form a frustoconical bearing face and in which that portion of the bearing face on the nut is also frustoconical, the conical angles being substantially equal.

6. In a blind fastener of the type having a central axis and an axially extending sleeve with an axially extending internally threaded passage therethrough, a head at one end having an axially facing surface thereon with a periphery which is centered on said axis, and an external taper on the other end; a mandrel including an axially extending threaded shank threaded into and through said passage, a torque-off groove on said shank, a head on said mandrel with a bearing surface facing said tapered end, and torque tool engaging means on the opposite side of said sleeve from said head; a tubular collar on said mandrel between said tapered end of said sleeve and said mandrel head; and a nut threaded to said mandrel with a bearing face facing toward said surface of the head of said sleeve, the improvement comprising:
said bearing face of said nut being concavely shaped so as to make contact with and thereby a retention engagement with at least some points around said periphery to hold the sleeve against rotation relative to the nut when the mandrel is drawn into the sleeve with the nut pressed against said head.

7. A blind fastener according to claim 6 in which said bearing face of said nut is frusto-conical where it contacts said points.

8. In a blind fastener of the type having a central axis and an axially extending sleeve with an axially extending internally threaded passage therethrough, a head at one end having an axially facing surface thereon with a circumferentially extending circular edge thereon which is centered on said axis, and an external taper on the other end; a mandrel including an axially extending threaded shank threaded into and through said passage, a torque-off groove on said shank, a head on said mandrel with a bearing surface facing said tapered end, and torque tool engaging means on the opposite side of said sleeve from said head; a tubular collar on said mandrel between said tapered end of said sleeve and said mandrel head; and a nut threaded to said mandrel with a bearing face facing toward said surface of the head of said sleeve, the improvement comprising:
a cylindrical land around said head forming said edge with said axially facing surface; and
said bearing face of said nut being concavely shaped so as to make a continuous circular retention engagement with said circular edge to hold the sleeve against rotation relative to the nut when the mandrel is drawn into the sleeve with the nut pressed against said edge.

9. A blind fastener according to claim 8 in which said head is a flush countersink head, the circular edge and the land being formed around its periphery.

10. A blind fastener according to claim 8 in which said land enables the bearing face axially and radially to overhang part of said land, whereby to clear and not to contact a workpiece in which the fastener is fitted.

11. A blind fastener according to claim 10 in which the outer surface of said nut contiguous to the bearing face extends away from the bearing face at a lesser angle than the countersink angle of the head.

12. A blind fastener according to claim 8 in which said head is a protruding type fastener head.

13. A blind fastener according to claim 8 in which a frustoconical engagement face is formed as part of said edge, extending between said axially facing surface and said land.

14. A blind fastener according to claim 13 in which said bearing face of said nut is also frustoconical, and in which the conical angles of the bearing faces on the nut and on the sleeve are substantially equal so they make a substantial area of surface to surface contact with one another.

15. A blind fastener according to claim 14 in which the one-half conical angle of the engagement surface on the sleeve is about 63 degrees 30 minutes.

* * * * *